United States Patent
Schank et al.

(10) Patent No.: US 8,003,265 B2
(45) Date of Patent: Aug. 23, 2011

(54) GAS CONDITIONING DEVICE AND METHOD

(75) Inventors: William Schank, Howell, MI (US); Milos Milacic, New Boston, MI (US)

(73) Assignee: Ford Motor Company, Dearborn, MI (US)

( * ) Notice: Subject to any disclaimer, the term of this patent is extended or adjusted under 35 U.S.C. 154(b) by 1322 days.

(21) Appl. No.: 11/433,344

(22) Filed: May 11, 2006

(65) Prior Publication Data

US 2007/0264538 A1    Nov. 15, 2007

(51) Int. Cl.
*H01M 8/00*    (2006.01)
*H01M 5/00*    (2006.01)
*F28D 5/00*    (2006.01)

(52) U.S. Cl. ............ 429/413; 429/457; 62/304; 261/158

(58) Field of Classification Search .................. None
See application file for complete search history.

(56) References Cited

U.S. PATENT DOCUMENTS

| | | | |
|---|---|---|---|
| 2,610,038 A | 9/1952 | Phillips | |
| 5,547,776 A | 8/1996 | Fletcher et al. | |
| 5,965,288 A | 10/1999 | Okamoto | |
| 6,284,399 B1 | 9/2001 | Oko et al. | |
| 6,294,280 B1 | 9/2001 | Tanaka et al. | |
| 6,566,001 B2 | 5/2003 | Yosida et al. | |
| 6,653,012 B2 | 11/2003 | Suzuki et al. | |
| 6,808,835 B2 | 10/2004 | Green et al. | |
| 6,864,005 B2 | 3/2005 | Mossman | |
| 2007/0007674 A1* | 1/2007 | Hasegawa et al. | 261/104 |

* cited by examiner

Primary Examiner — Barbara L. Gilliam
Assistant Examiner — Angela J. Martin
(74) Attorney, Agent, or Firm — Tung & Associates

(57) ABSTRACT

A humidification device is disclosed. An illustrative embodiment of the humidification device includes at least one wet gas channel and at least one dry gas channel disposed in adjacent relationship to the at least one wet gas channel. The at least one wet gas channel and the at least one dry gas channel are adapted for exchange of moisture there between. A fuel cell system and a method of moisturizing a gas are also disclosed.

4 Claims, 4 Drawing Sheets

GAS CONDITIONING DEVICE AND METHOD

FIELD

The present invention relates to gas conditioning devices. More particularly, the present invention relates to a spiral gas-to-gas humidification/dehumidification device and method which among other applications can be used in fuel cell systems.

BACKGROUND

In some applications, membrane exchange humidifiers typically include a water-permeable and/or water vapor-permeable membrane. A gas stream which requires humidification, or dry stream, flows over one surface of the membrane, whereas a moisture-laden gas stream flows over the opposite surface of the membrane. Moisture from the moisture-laden stream passes through the membrane and enters the dry stream.

In some humidifier systems, such as fuel cell applications, for example, the ionic conductivity of a polymer electrolyte membrane, and therefore, the performance of the system, depends on the hydration level of the membrane. Consequently, in a fuel cell system, the fuel gas stream, the oxidant gas stream or both may be humidified to sufficiently hydrate the polymer electrolyte membrane and sustain optimum performance of the fuel cell. In some fuel cell applications, an air stream directed into the fuel cell is humidified by the moisture-laden cathode exhaust stream discharged from the cathode of the fuel cell. However, it is typically necessary to humidify the oxidant gas stream in order to optimize fuel cell performance.

The capability of the reactant gases to absorb water vapor varies with temperature and pressure. If a reactant gas stream is moisturized at a temperature which exceeds that of the operating temperature of the fuel cell, moisture has a tendency to condense on surfaces as the gas stream enters the fuel cell. This may lead to flooding of the electrodes, thereby adversely affecting fuel cell performance. On the other hand, if the reactant gas stream is moisturized at a temperature which is lower than the operating temperature of the fuel cell, the reduced water vapor in the reactant gas stream has a tendency to dehydrate and damage the polymer electrolyte membrane. Therefore, it is preferable to moisturize a reactant gas stream, typically at least an oxidant gas stream, at or close to the operating temperature and pressure of a fuel cell.

SUMMARY

The present invention is generally directed to a humidification/dehumidification device. An illustrative embodiment of the device includes at least one wet gas channel and at least one dry gas channel disposed in adjacent relationship to the at least one wet gas channel. The at least one wet gas channel and the at least one dry gas channel are adapted for exchange of water there between. The present invention is further directed to a a method of humidifying a dry gas (while dehumidifying the wet gas).

BRIEF DESCRIPTION OF THE DRAWINGS

The invention will now be described, by way of example, with reference to the accompanying drawings, in which.

DETAILED DESCRIPTION

Figure 3:
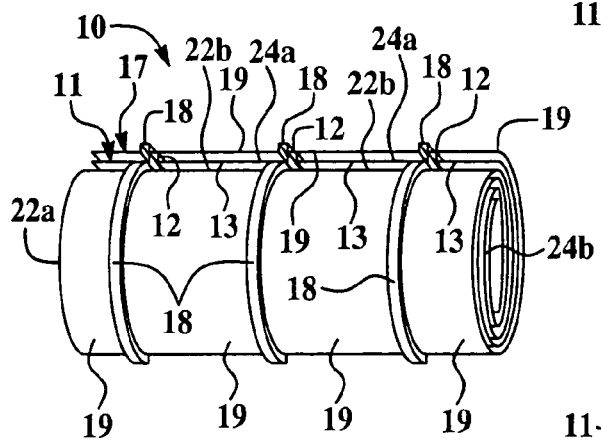
FIG. 3 is a side perspective view of an illustrative embodiment of the humidification/dehumidification device.
Figure 4:
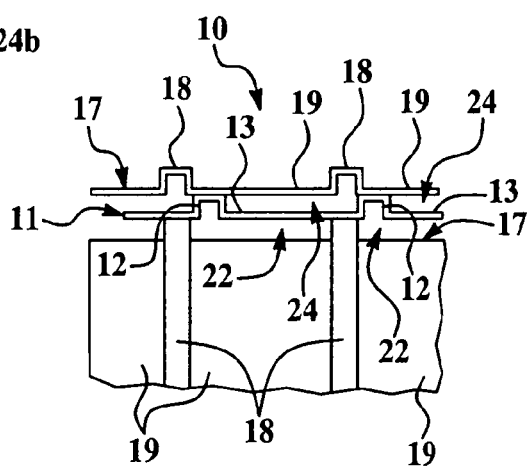
FIG. 4 is a side view, partially in section, of the humidification/dehumidification device, illustrating multiple wet gas outlets and dry gas inlets formed by the inner and outer membrane sheets.
Figure 5:
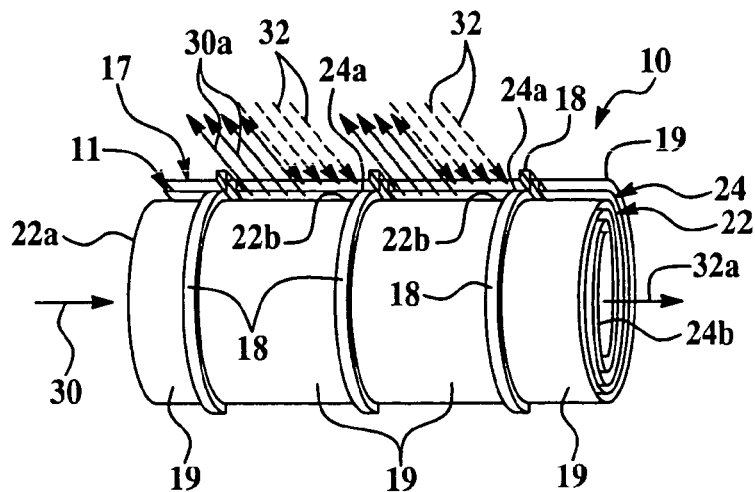
FIG. 5 is a side perspective view of an illustrative embodiment of the humidification/dehumidification device, illustrating flow of gases through the humidification/dehumidification device in typical use of the device.

Referring initially to FIGS. 1-8 of the drawings, an illustrative embodiment of a humidification/dehumidification device according to the present invention is generally indicated by reference numeral 10 in FIGS. 3-6. Briefly, as shown in FIG. 5 and will be hereinafter described in more detail, the humidification/dehumidification device 10 is suitable for use as a gas-to-gas humidifier/dehumidifier in any of a variety of applications. The humidification device 10 can be used to receive a wet gas 30 and a dry gas 32 and transfer moisture from the wet gas 30 to the dry gas 32, thereby changing the wet gas 30 into a dried wet gas 30a and the dry gas 32 into a humidified gas 32a.

Figure 2:
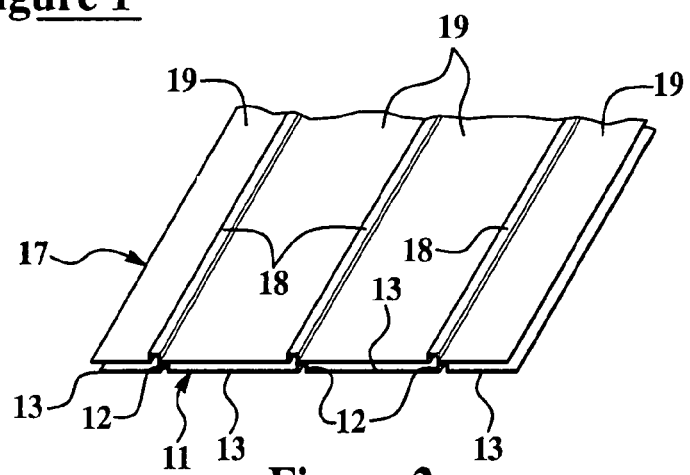
FIG. 2 is a perspective view of a section of an illustrative embodiment of a humidification/dehumidification device, with the inner and outer membrane sheets of FIG. 1 disposed in functional position with respect to each other in assembly of the humidification/dehumidification device.

The humidification/dehumidification device 10 typically includes an inner membrane 11 and an outer membrane 17 which are stacked or layered with respect to each other, as shown in FIG. 2, and wound in a spiral configuration to form the humidification/dehumidification device 10. The inner membrane 11 and the outer membrane 17 may be any material which is capable of facilitating the exchange of water or humidity while being impervious to gas. One example of a material which is suitable for the inner membrane 11 and the outer membrane 17 includes _GORE-TEX or Nafion among numerous other materials.

Figure 1:
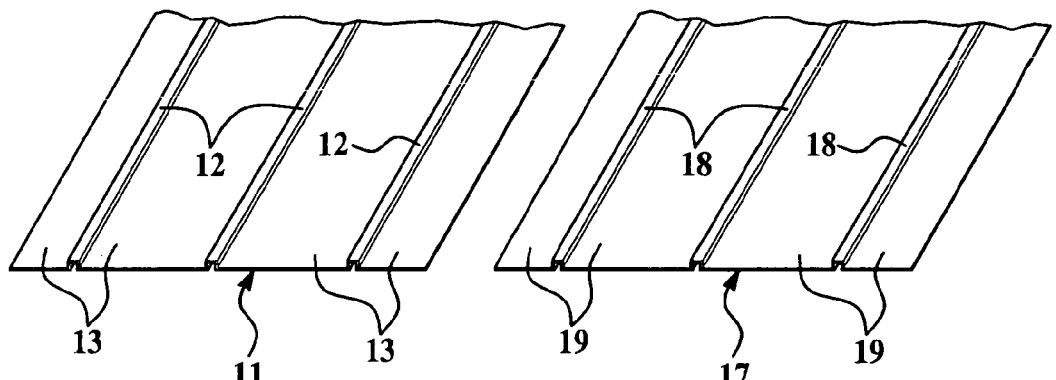
FIG. 1 is a perspective view, partially in section, of an inner water permeable membrane sheet and an outer water permeable membrane sheet suitable for assembly of an illustrative embodiment of a humidification/dehumidification device.

As shown in FIG. 1, the inner sheet 11 typically includes multiple straight portions 13 which are separated from each other by sheet spacers 12. The spacers 12 may be, for example, standoffs that are folded or otherwise formed in the inner channel sheet 11. The sheet spacers 12 are typically disposed in generally parallel relationship to each other throughout the entire length of the inner sheet 11. The outer sheet 17 typically has a design which is the same as or a similar to that of the inner sheet 11, including multiple straight portions 19 which are separated from each other by generally parallel sheet spacers 18 that typically traverse the entire length of the outer sheet 17.

Figure 7:
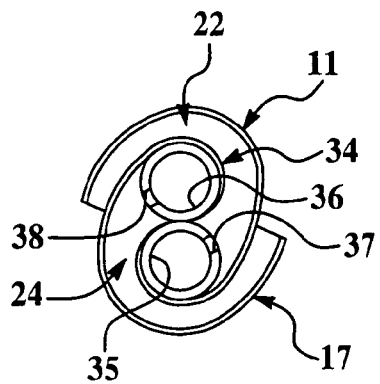
FIG. 7 is a cross-sectional view of a dual-manifold mandrel, with the inner and outer membrane sheets (shown in section) wound on the mandrel.
Figure 6:
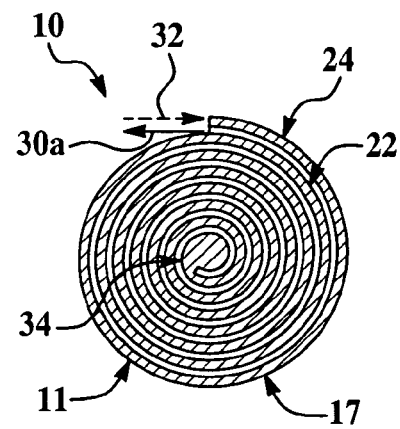
FIG. 6 is a cross-sectional view of the humidification/dehumidification device.

As shown in FIG. 7, the inner sheet 11 and the outer sheet 17 are attached to a central, dual-manifold mandrel 34 having a wet gas inlet passage 35 and a humidified gas outlet passage 36. As shown in FIG. 6, the inner sheet 11 and the outer sheet 17 are wound around each other in a spiral configuration from the manifold 34 and outwardly. As shown in FIG. 4, the sheet spacers 12 of the inner channel sheet 11 engage and maintain the straight portions 19 of the outer sheet 17 in spaced-apart relationship with respect to the straight portions 13 of the inner sheet 11. Therefore, the inner sheet 11 and the outer sheet 17 together form a dual-manifold or channel design, with a dry gas channel 24 formed between the adjacent stacked inner sheet 11 and outer sheet 17 and a wet gas channel 22 formed between the inner sheet 11 on the outside and the adjacent spiraled portion of the outer sheet 17 toward the inside of the humidification/dehumidification device 10. As further shown in FIG. 4, multiple adjacent wet gas channels 22 may be separated from each other by the sheet spacers 18 of the outer sheet 17, whereas multiple adjacent dry gas channels 24 may be separated from each other by the sheet spacers 12 of the inner sheet 11. As shown in FIG. 7, the wet gas inlet passage 35 of the manifold mandrel 34 communicates with the wet gas channels 22 through respective openings 37, whereas the humidified gas outlet passage 36 of the manifold mandrel 34 communicates with the dry gas channels 24 through respective openings 38.

At one end of the humidification/dehumidification device 10, a wet gas inlet 22a communicates with the wet gas inlet passage 35 of the manifold mandrel 34. At the opposite end of the humidification/dehumidification device 1, a moisturized gas outlet 24b communicates with the moisturized gas outlet passage 36 of the manifold mandrel 34. As shown in FIG. 3, at the outer edges of the inner sheet 11 and the outer sheet 17, each wet gas channel 22 discharges as a wet gas outlet 22b and each dry gas channel 24 discharges as a dry gas inlet 24a. Accordingly, the wet gas channels 22 establish fluid communication between the wet gas inlet passage 35 of the manifold mandrel 34 and the respective wet gas outlets 22b, whereas the dry gas channels 24 establish fluid communication between the respective dry gas inlets 24a and the moisturized gas outlet passage 36 of the manifold mandrel 34.

Referring to FIG. 5, in typical counter flow realization of the application (in co-flow realization both gases flow in the same direction, either from center outwards, or inwards toward center), the humidification/dehumidification device 10 receives a wet gas 30 and a dry gas 32 and transfers water vapor from the wet gas 30 to the dry gas 32 in order to humidify or increase the relative humidity of the dry gas 32 under any circumstance or process in which it is deemed necessary to humidify the dry gas 32. Accordingly, the wet gas 30 enters the wet gas inlet passage 35 of the manifold mandrel 34 through the wet gas inlet 22a of the humidification/dehumidification device 10. From the wet gas inlet passage 35, the wet gas 30 travels outwardly through the spiral wet gas channels 22 defined by the inner sheet 11 and the outer sheet 17. Finally, the wet gas 30 is discharged as dried out gas 30a from the wet gas outlets 22b.

Simultaneously, the dry gas 32 enters the dry gas inlets 24a, flows inwardly through the spiral dry gas channels 24 and enters the humidified gas outlet 36 of the manifold mandrel 34. Finally, the dry gas 32 exits the humidified gas outlet 36 as humidified gas 32a. As the wet gas 30 spirals outwardly through the wet gas channels 22 and the dry gas 32 simultaneously spirals inwardly through the dry gas channels 24, water in the wet gas 30 diffuses through the walls of the wet gas channels 22, defined by the inner sheet 11 and the outer sheet 17, and enters the dry gas channels 24. However, the wet gas 30 remains separated from the dry gas 32 in the dry gas channels 24 and the dry gas 32 remains separate from the wet gas 30 in the wet gas channels 22. Consequently, the relative humidity of the wet gas 30 in the wet gas channels 22 decreases while the relative humidity of the dry gas 32 in the dry gas channels 24 increases. After it is discharged from the humidified gas outlet passage 36 through the humidified gas outlet 24b, the humidified gas 32a or dried gas 30a are used in the desired application.

Figure 8:
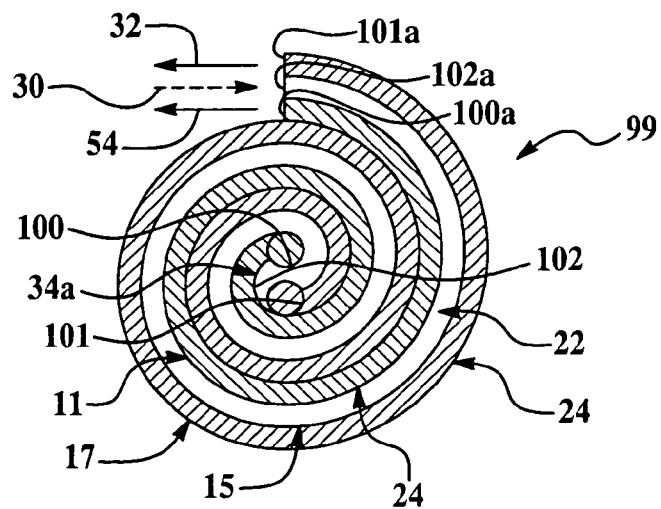
FIG. 8 shows cross section of yet another implementation of humidification/dehumidification device suitable for humidifying (or drying) 2 gas streams at once.

Referring next to FIG. 8, a cross section of dual stream (three-chamber) gas conditioning device 99 is shown. The three-chamber gas conditioning device 99 includes a tri-manifold mandrel 34a which includes a dry gas inlet passage 100, a dry gas inlet passage 101 and a wet gas outlet passage 102. An inner membrane 11, a middle membrane 15 and an outer membrane 17 are wound on the tri-manifold mandrel 34a, typically in the same manner as was heretofore described with respect to the inner membrane 11 and outer membrane 17 of the humidification device 10 shown in FIGS. 1-7. The middle membrane 15 may have the same design as that of the inner membrane 11 and the outer membrane 17. Accordingly, the inner membrane 11, the middle membrane 15 and the outer membrane 17 define a pair of dry gas channels 24 and a wet gas channel 22 which spiral outwardly from the tri-manifold mandrel 34a. The wet gas channel 22 is interposed between the dry gas channels 24. The dry gas channels 24 communicate with the dry gas inlet passage 100 and the dry gas inlet passage 101, respectively, of the tri-manifold mandrel 34a, whereas the wet gas channel 22 communicates with the wet gas outlet passage 102 of the tri-manifold mandrel 34a. At the outer portion of the gas conditioning device 99, the dry gas channels 24 discharge at a dry gas outlet 100a and a dry gas outlet 101a, respectively. A wet gas inlet 102a of the wet gas channel 22 is between the dry gas outlet 100a and the dry gas outlet 101a. Accordingly, in typical use of the gas conditioning device 99, a dry gas 32 and a dry gas 54 are distributed into the dry gas inlet passage 100 and dry gas inlet passage 101, respectively, of the tri-manifold mandrel 34a; through the respective spiral dry gas channels 24; and are discharged from the dry gas outlet 100a and the dry gas outlet 101a, respectively. Simultaneously, a wet gas 30 is distributed into the wet gas inlet 102a, through the wet gas channel 22 and discharged from the tri-manifold mandrel 34a through the wet gas outlet passage 102, respectively. As the wet gas 30 flows in an inward spiral through the wet gas channel 22, humidity is transferred from the wet gas 30 and into the dry gas channels 24 to humidify the dry gases 32, 54 flowing in an outward spiral through the dry gas channels 24. The wet gas 30 is discharged from the wet gas outlet passage 102 of the tri-manifold mandrel 34a as a dried or de-humidified wet gas 30a (FIG. 10C).

Figure 9:
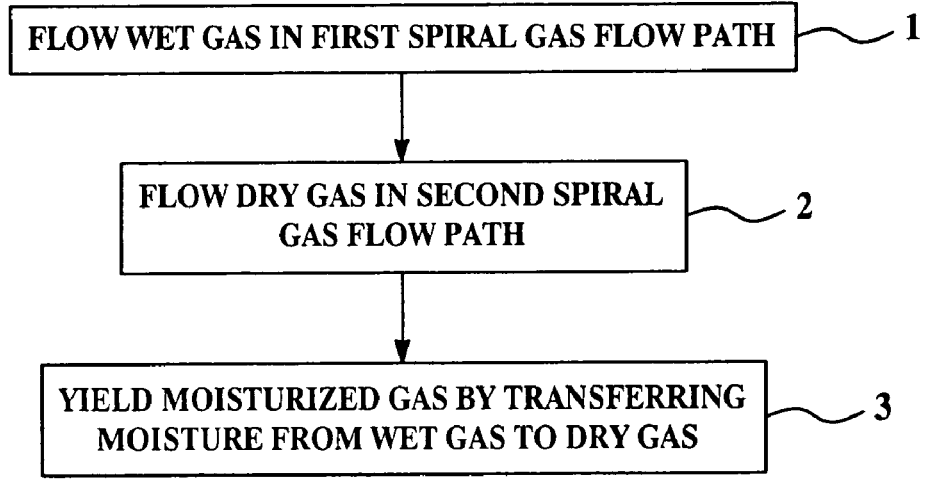
FIG. 9 is a flow diagram which illustrates an illustrative method of humidifying/drying a gas.

Referring next to the flow diagram of FIG. 9, an illustrative method of moisturizing a gas is shown. In step 1, a wet gas is distributed in a first spiral gas flow path. In step 2, a dry gas is distributed in a second spiral gas flow path. In step 3, moisturized gas is yielded from the dry gas by transferring moisture from the wet gas to the dry gas.

Figure 8A:
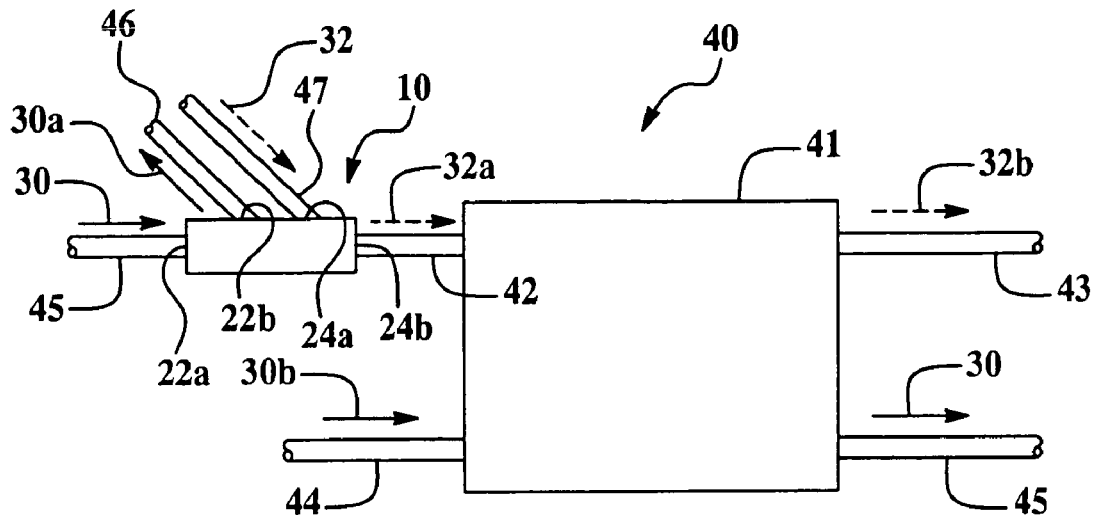

Referring next to FIG. 8A, a fuel cell system 40 in implementation of a gas conditioning device 10 for humidification is shown. The fuel cell system 40 typically includes a fuel cell stack 41 which includes multiple, stacked fuel cells (not shown) and may have a conventional structure. The fuel cell stack 41 includes an cathode inlet 42, an anode outlet 43, a anode inlet 44 and a cathode outlet 45. The gas conditioning device 10 is suitable for humidifying an oxidant gas such as air, which is designated as the dry gas 32 and the humidified gas 32a in FIG. 8A, prior to distribution of the oxidant gas into the cathode side of the fuel cell stack 41.

An air inlet 47 is disposed in fluid communication with the dry gas inlet or inlets 24a of the humidification/dehumidification device 10. The humidified gas outlet 24b of the humidification/dehumidification device 10 is disposed in fluid communication with the cathode inlet 42 of the fuel cell system 40. The cathode outlet 45 of the fuel cell system 40 is disposed in fluid communication with the wet gas inlet 22a of the humidification/dehumidification device 10. An exhaust conduit 46 is disposed in fluid communication with the wet gas outlets 22b of the humidification/dehumidification device 10.

In operation of the humidification/dehumidification device 10 in conjunction with the fuel cell system 40, the dry gas 32 is a oxidant gas, such as air, for operation of the fuel cell system 40. The dry air 32 is distributed into the humidification device 10 through the dry gas inlet 47. Accordingly, the dry air 32 flows through the dry gas inlets 24a (FIG. 5) and the dry gas channels 24 (FIGS. 4 and 6), respectively, where the dry air 32 is humidified, through a process which will be hereinafter described, to yield humidified oxidant gas 32a. The humidified oxidant gas 32a flows from the dry gas channels 24 and into the humidified gas outlet passage 36 (FIG. 7) of the manifold mandrel 34 and is discharged into the cathode inlet 42 through the humidified gas outlet 24b, respectively. The humidified air 32a is distributed through the fuel cell stack 41.

As the humidified air 32a flows into the cathode side of the fuel cell stack 41 through the cathode inlet 42, a fuel gas 30b, such as hydrogen, for example, flows into the anode side of the fuel cell stack 41 through the anode inlet 44. At the anode (not shown) in the anode side of the fuel cell stack 41, electrons are harvested from the hydrogen. The electrons are distributed through an external circuit (not shown) and drive an electric motor (not shown) in typical application. The protons from the hydrogen are passed through a proton exchange membrane (PEM) (not shown) and to the cathode (not shown) in the cathode side of the fuel cell stack 41. The electrons are returned to the cathode from the external circuit and combined with the protons and the oxygen in the humidified oxidant gas 32a to form water vapor. The water vapor, along with excess or exhaust oxidant gas, is discharged from the fuel cell stack 41 through the cathode outlet 45 as wet exhaust gas 30.

The wet exhaust gas 30 is distributed through the cathode outlet 45 and into the wet gas inlet passage 35 (FIG. 7) of the manifold mandrel 34 in the humidification/dehumidification device 10 through the wet gas inlet 22a. From the wet gas inlet passage 35, the wet exhaust gas 30 spirals outwardly through the wet gas channels 22 of the humidification/dehumidification device 10 and is discharged through the wet gas outlets 22b and exhaust conduit 46, respectively. As the wet exhaust gas 30 passes through the wet gas channels 22, moisture in the wet exhaust gas 30 passes through the walls of the wet gas channels 22 and enters the inwardly-spiraling dry fuel gas 32 in the dry gas channels 24, thereby moisturizing or raising the relative humidity of the dry oxidant gas, namely air, 32 to yield the humidified oxidant gas 32a prior to entry of the humidified oxidant gas 32a into the cathode side of the fuel cell stack 41 through the cathode inlet 42. Accordingly, throughout operation of the fuel cell system 40, the humidity content in the wet exhaust gas 30 ensures humidification of the dry air 32 in order to yield the humidified air 32a as it passes through the humidification/dehumidification device 10. The humidified oxidant gas 32a, in turn, ensures adequate humidification of the PEM (not shown) in the fuel cell stack 41. Excess or exhaust fuel gas 32b is distributed from the fuel cell stack 41 through the anode outlet 43.

Figure 10A:
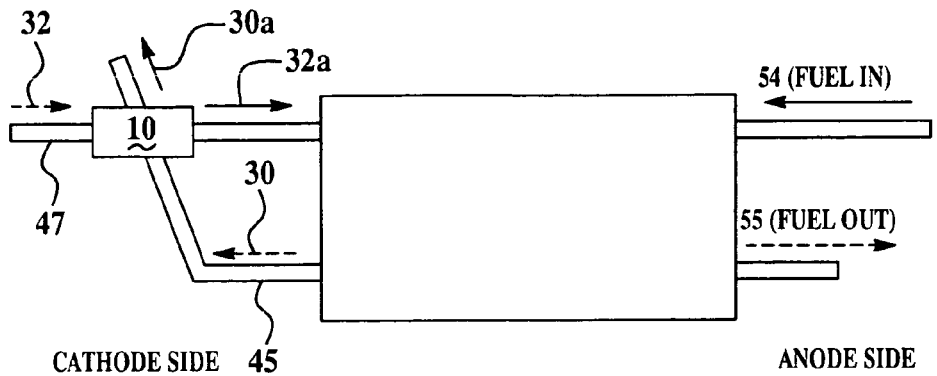
FIG. 10A is a schematic diagram of a fuel cell system fitted with an illustrative embodiment of a humidification/dehumidification device used as a humidification device for a cathode stream.

In other embodiments, shown in FIG. 10a, dry gas 32, typically air, is directed through the humidification device 10, which is provided in the air inlet 47. The dry gas 32 emerges from the humidification device 10 as humidified gas 32a and is distributed by the air inlet 47 into the fuel cell stack 41. Wet gas 30, typically air, is distributed from the cathode outlet 45 and directed through the humidification device 10, where humidity from the wet gas 30 is transferred to the dry gas 32 to form the humidified gas 32a.

Figure 10B:
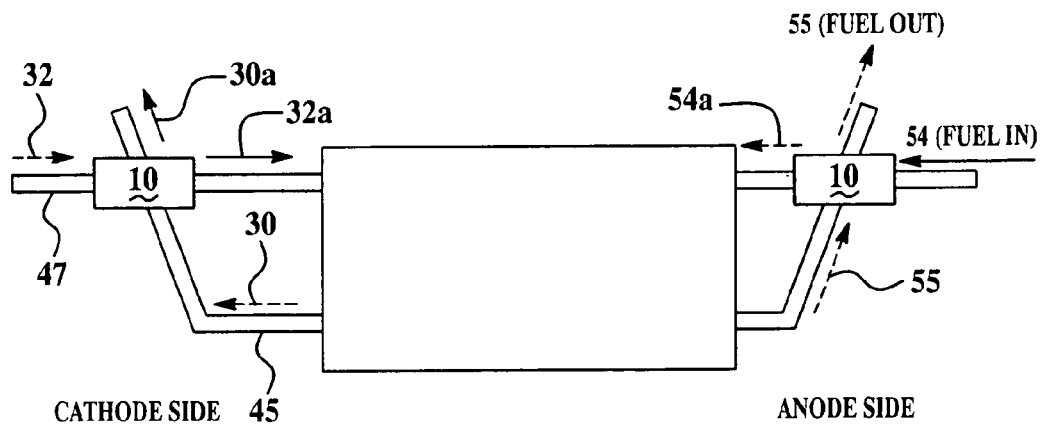
FIG. 10B is a schematic diagram of a fuel cell system fitted with an illustrative embodiment of a humidification/dehumidification device used as a humidification device for both anode and cathode streams.
Figure 10C:
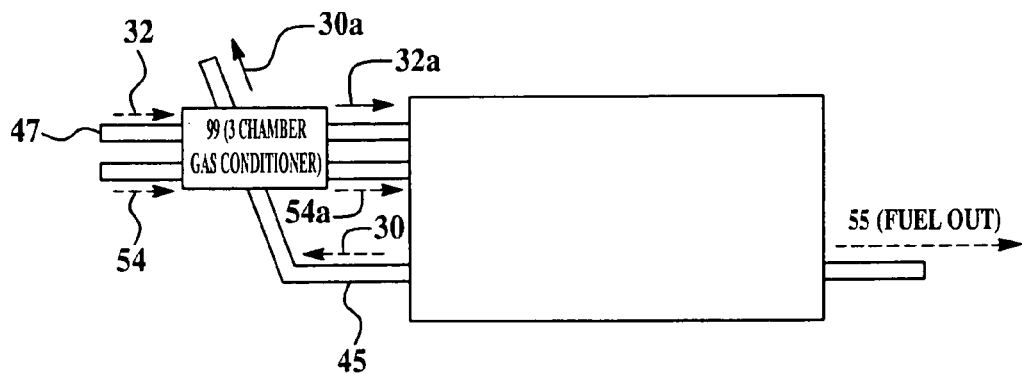
FIG. 10C shows use of a three-chamber embodiment of a humidification/dehumidification device used for humidifying anode and cathode streams.

In some other configurations, shown in FIG. 10b, two gas conditioning devices 10 are configured to humidify both cathode 32 and anode 54 dry gases using cathode 30 and anode 55 fuel cell exhaust wet gases, respectively. FIG. 10c shows use of a three-chamber gas conditioning device 99, an example of which was heretofore described with respect to FIG. 8. The gas conditioning device 99 shown in FIG. 10c is configured to humidify both fuel 54 and cathode 32 dry gases by wet cathode exhaust gas 30.

In some embodiments of the method, the wet gas includes wet exhaust gas from a fuel cell stack. The dry gas may include dry oxidant or fuel gas and the humidified gas may include humidified oxidant or fuel gas for a fuel cell stack. In some embodiments, an anode inlet communicates with the fuel cell stack and the humidified fuel gas is distributed into the anode inlet.

In some embodiments of the method, a manifold mandrel having a wet gas inlet passage and a humidified gas outlet passage is provided. At least one wet gas channel is provided in communication with the wet gas inlet passage and at least one dry gas channel is provided in communication with the humidified gas outlet passage. Flowing a wet gas in a first spiraled gas flow path may include distributing the wet gas from the wet gas inlet passage and through the at least one wet gas channel and flowing a dry gas in a second spiraled gas flow path adjacent to the wet gas may include distributing the dry gas from the at least one dry gas channel and into the humidified gas outlet passage.

In some embodiments of the method, a fuel cell stack having an anode inlet and a cathode outlet is provided. The cathode outlet is provided in fluid communication with the wet gas inlet passage. The cathode inlet is provided in fluid communication with the humidified gas outlet passage.

While the preferred embodiments of the invention have been described above, it will be recognized and understood that various modifications can be made in the invention and the appended claims are intended to cover all such modifications which may fall within the spirit and scope of the invention.

What is claimed is:

1. A fuel cell system, comprising:
    a fuel cell stack;
    an anode inlet, an anode outlet, a cathode inlet and a cathode outlet communicating with said fuel cell stack;
    a gas conditioning device having a spiral configuration with at least one spiral dry gas channel disposed in a peripheral direction of said spirally configured gas conditioning device and communicating with said cathode inlet and at least one spiral wet gas channel similarly disposed in said peripheral direction adjacent to said at least one dry gas channel and communicating with said cathode outlet; and wherein said at least one wet gas channel and said at least one dry gas channel are adapted for exchange of moisture there between.

2. The fuel cell system of claim 1 further comprising at least one wet gas outlet communicating with said at least one wet gas channel and an exhaust conduit communicating with said at least one wet gas outlet.

3. The fuel cell system of claim 1 further comprising at least one dry gas inlet communicating with said at least one dry gas channel and a fuel inlet communicating with said at least on a dry gas inlet.

4. The fuel cell system of claim 1 further comprising a manifold mandrel having a wet gas inlet passage communicating with said at least one wet gas channel and a moisturized gas outlet passage communicating with said at least one dry gas channel.

* * * * *